United States Patent [19]
Schenten

[11] 3,803,939
[45] Apr. 16, 1974

[54] ADJUSTABLE TILTABLE STEERING COLUMN

[75] Inventor: James L. Schenten, Sterling Heights, Mich.

[73] Assignee: Chrysler Corporation, Highland Park, Mich.

[22] Filed: Dec. 1, 1972

[21] Appl. No.: 311,089

[52] U.S. Cl.................. 74/493, 74/531, 248/299
[51] Int. Cl............................ B62d 1/18, G05g 5/16
[58] Field of Search............. 74/493, 531; 248/299; 292/275

[56] References Cited
UNITED STATES PATENTS

| | | | |
|---|---|---|---|
| 3,724,290 | 4/1973 | Burton | 74/493 |
| 3,307,420 | 3/1967 | Fisher | 74/493 |
| 3,299,733 | 1/1967 | Felts et al. | 248/299 X |
| 1,367,695 | 2/1921 | Gray | 74/493 |
| 1,666,803 | 4/1928 | Walker | 248/454 |
| 1,671,784 | 5/1928 | Rubin | 292/275 |
| 2,185,779 | 1/1940 | Tveidt | 74/493 |
| 2,244,391 | 6/1941 | DeLisle | 248/454 X |
| 3,082,640 | 3/1963 | Blomberg | 74/531 |
| 3,279,277 | 10/1966 | Stevens et al. | 74/493 |
| 3,504,569 | 4/1970 | Zoltok | 74/493 |

Primary Examiner—Allan D. Herrmann

[57] ABSTRACT

Adjustable tilting steering column including two brackets, one of which is connected to an instrument panel and the other of which is connected to the column and slideable within the first bracket. A spring biased clamping cam causes the outer bracket to clamp the inner bracket in any one of an infinite number of positions throughout a range of movement of the movable bracket.

15 Claims, 5 Drawing Figures

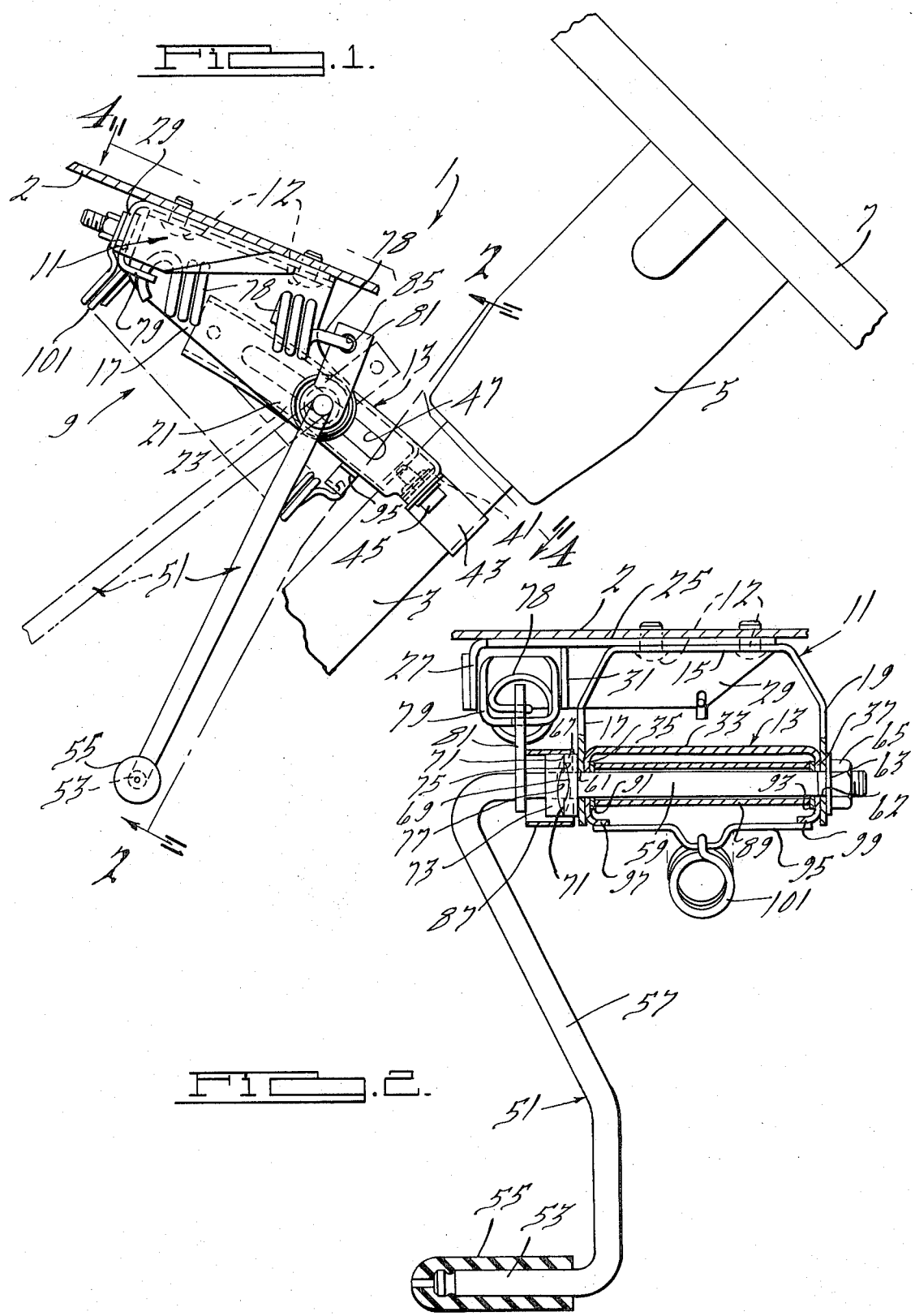

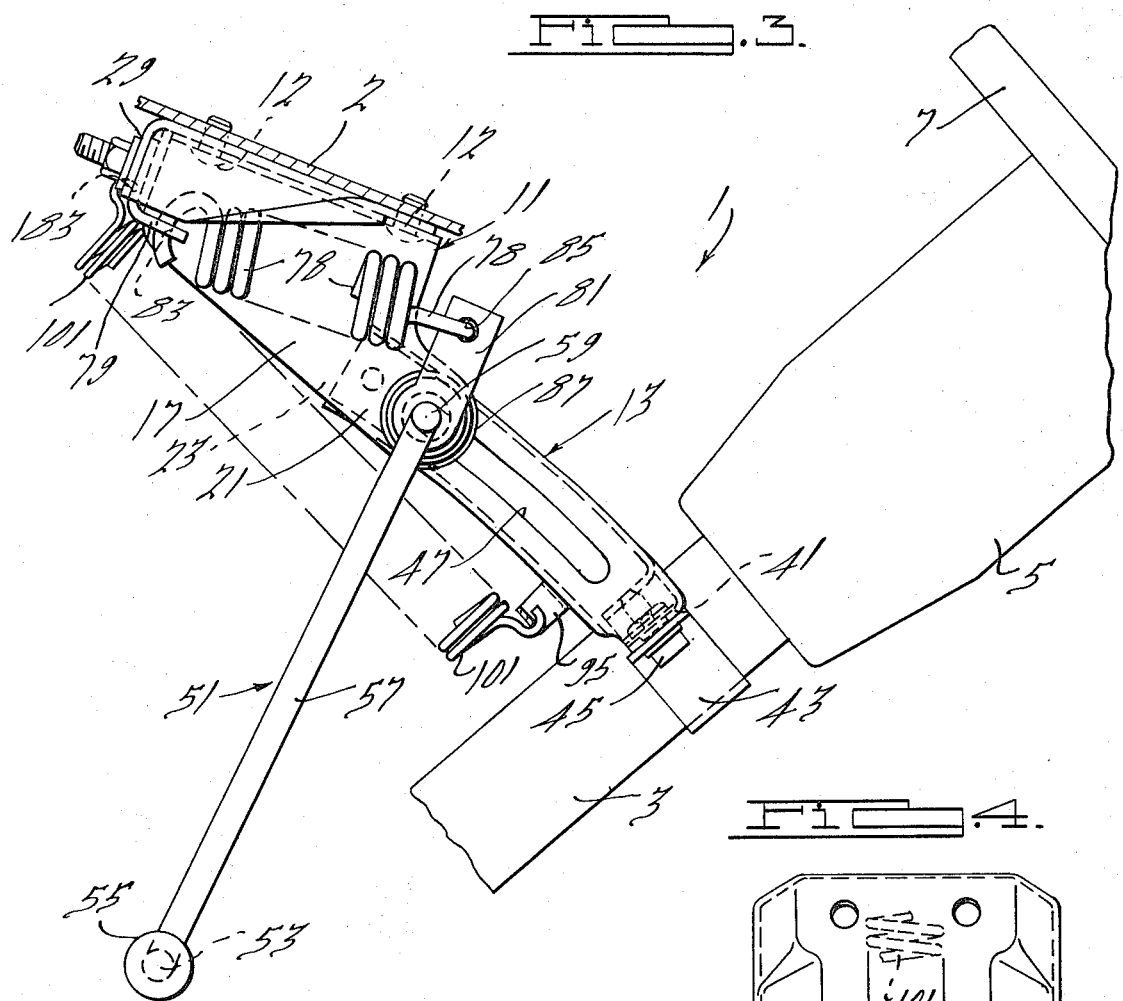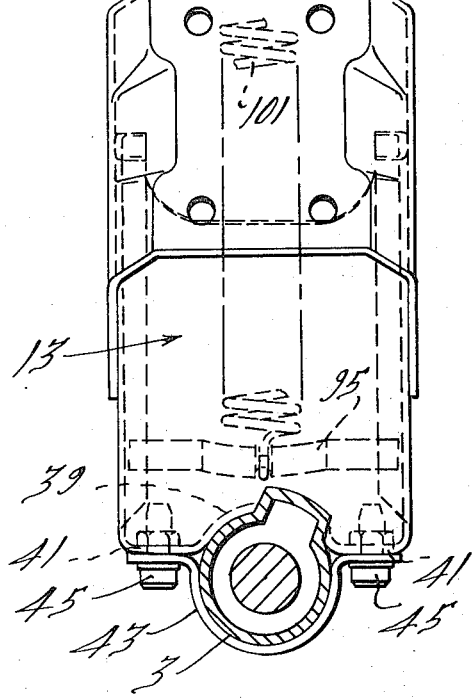

ADJUSTABLE TILTABLE STEERING COLUMN

BACKGROUND OF THE INVENTION

This invention relates to adjustable steering column devices, and more particularly to an adjustable tilting steering column device for a vehicle the position of which may be conveniently selected by the driver.

Tiltable steering column devices for vehicles, such as automobiles, trucks, motor homes and the like are well-known. One type of tiltable column device includes a relatively fixed column having a steering shaft therein, the upper position of which is connected by a swivel connection to the lower portion of the shaft. The steeing wheel is connected to the tiltable upper portion of the shaft and may be moved to a fixed number of predetermined positions. Various latching devices are utilized for securing the upper portion of the shaft in any one of the predetermined positions.

Another type of tilting column device is that which, in fact, requires the complete column to tilt or pivot about a point removed from the steering wheel, such as at the floor of the vehicle. These devices also normally have a predetermined number of positions and include means for locking or securing the column in any one of these positions.

The present inventon relates to the type of adjustable tilting column wherein the column tilts, as opposed to the type in which only an upper portion of a steering shaft tilts or swivels.

BRIEF SUMMARY OF THE INVENTION

Briefly, this invention comprises two brackets, one of which is secured to a panel and the other of which is connected to a movable column, and means for clamping the two brackets together in a selected position.

One of the primary objects of this invention is to provide an adjustable steering column device adapted to be moved to and secured in any one of an infinite number of positions throughout a predetermined range.

Another one of the objects of this invention is an adjustable steering column device of the type described which may be locked and unlocked by a simple maneuver of the foot.

A further object of this invention is to provide an adjustable tilting column such as described which may be easily moved to any one of an indefinite number of positions.

Still another object of this invention is to provide an adjustable column of the type described which may easily be adjusted while the vehicle is in motion.

Another object of this invention is to provide an adjustable tilting column of the class described which will be automatically locked in a position if a foot operated release is itself released, such as by a foot slipping off of it, for example, thus assuring the driver of a stable wheel and a column which does not swing freely unless the driver wishes to adjust its position.

A further object of this invention is to provide an adjustable tilting column of the class described which is economical in construction and effective in operation.

Other objects and advantages of this invention will be made apparent as the description progresses.

BRIEF DESCRIPTION OF THE DRAWINGS

In the accompanying drawings in which one of several various possible embodiments is illustrated, FIG. 1 is a side elevation of an adjustable column device constructed in accordance with this invention, the column being shown in one position;

FIG. 2 is a section taken along line 2—2 of FIG. 1;

FIG. 3 is a side elevation similar to FIG. 1 showing the device in another position;

FIG. 4 is a section view looking generally along line 4—4 of FIG. 1, certain portions being removed for clarity; and FIG. 5 is an enlarged fragmentary view of a portion of the apparatus shown in FIG. 3, the parts being rotated with respect to their position in FIG. 3.

Like parts are indicated by corresponding reference characters throughout the several views of the drawings.

DESCRIPTION OF THE PREFERRED EMBODIMENT

Referring now to the drawings, a steering column is generally shown at 1. It includes an elongated tubular portion 3 having a hub section 5 and steering wheel 7 at the upper end thereof.

The column 1 is connected to an instrument panel 2 by an adjustable tilting device 9. Device 9 generally includes a fixed bracket 11 connected to the panel by fasteners 12 and a movable bracket 13 connected to the column 1. More specifically, bracket 11 is a stamping and generally has an inverted U-shape in cross section with a bottom 15 and sides 17 and 19 which extend downwardly therefrom. Arms 21 and 23 extend forwardly from walls 17 and 19, respectively. The bottom 15 has a plate 25 attached thereto by welding, for example, with the plate extending beyond side 17 and having a downwardly turned flange 27, and a downwardly turned rear side flange 29. An intermediate wall portion 31 extends downwardly from plate 25 between side flange 31 and side wall 17.

The movable bracket 13 is also generally in the shape of an inverted U and has a bottom 33 and side walls 35 and 37 depending therefrom, wall 35 being adjacent wall 17 and wall 37 being adjacent wall 19. The dimension from the outside face of wall 35 to the outside face of wall 37 is only slightly less than the dimension from the inside face of wall 17 to the inside face of wall 19 so that bracket 13 can slide between walls 17 and 19. The bottom 33 adjacent the forward end thereof has a generally curved indentation 39 with a downwardly extending lip 41 which mates with the upper portion of tube 3. A clamp 43 extends around the lower side of tubular member and secures the same to bracket 13 by means of fasteners 45.

Each wall 35 and 37 of bracket 13 has an elongated slot 47 curved on an arc having a radius equal to the distance from the pivot point of the column to the center of the arms 21 and 23 for a purpose to be made apparent. A pedal assembly 49 comprises a rod 51 formed to have a foot portion 53 on which a foot pad 55 is mounted. Portion 53 extends perpendicularly from an elongated shank portion 57 extending upwardly towards the bracket 11. Rod 51 has a shaft portion 59 extending generally parallel to foot portion 53 and through an opening 61 in side wall 17, through slots 47 and through an opening 62 in side wall 19. A washer 63 and nut 65 are located on the end of shaft 59 outside wall 19 and the flat face of a clamping cam 67 is secured to the wall 17. The cam 67 has an opening therein through which shaft 59 rotatably passes. The other face of cam 67 is generally rolling in contour and has two recessed portions or valleys 69 and two raised portions 71.

A second clamping cam 73 is secured to shaft 59 and its cam face has two raised portions 75 separated by two recessed portions 77 which merge with the raised portions 75. The raised portions 75 are wedged against the ramps of the raised portions 71 of cam 67 by a spring 78 extending between a bracket 79 secured to the rear wall 29 and a lever 81 extending upwardly from rod 59. The spring 78 has hooked ends which extend through openings 83 and 85 in the bracket 79 and lever 81, respectively. If grease or other lubricant is applied to the face of cams 67 and 73, a cover 87 may be placed between lever 81 and side wall 17 around the cams to prevent contact with the cams.

A tubular spacer 89 is located inside the moving bracket 13 and around shaft 59. Washers 91 and 93 are provided between the ends of spacer 89 and the inside of walls 35 and 37. A strap 95 extends across the bracket 13 between inturned flanges 97 and 99 of walls 35 and 37 and provides an anchor for one end of a coil spring 101. The other end of spring 101 is hooked to rear wall 29 at 183.

Assuming the various parts of the column are in the position shown in FIG. 1 and it is desired to tilt the column downwardly, operation of the apparatus is as follows:

First, it will be noted that the spring 78 has forced the raised portions 75 of cam 73 against the raised portions 71 of cam 67, thereby causing the washer 63 and nut 65, through the means of shaft 59, to be drawn toward cam 67 and wall 17, thereby causing wall 19 and wall 17 to exert a frictional clamping and locking force to the side walls of bracket 13. Accordingly, the column 1 is held in a fixed position.

The driver applies his foot to the pedal 55 and swings the rod 51 from its solid line position in FIG. 1 to its broken line position in such Fig. This causes the raised portions 75 of cam 73 to rotate away from the raised portions 71 of cam 67 toward the recessed portions 69 of such cam. The clamping force exerted on bracket 13 by walls 17 and 19 is relieved and the driver may swing the column downwardly from its FIG. 1 position toward its FIG. 3 position, for example. The downward swinging of the column is opposed by spring 101 so that the column will not fall to its FIG. 3 position, but rather must be moved by the driver.

When the column 1 is located at the position desired, the driver releases the pedal 55 and rod 51 from the actuated FIG. 1 position. The spring 78 swings the lever 81 from the broken line position in FIG. 1 to its solid line position thereby moving the raised portions 75 of cam 73 from the recessed portions 69 of cam 67 against the ramps of the raised portions 71 of cam 67, thereby moving the cam 67 and wall 17 to the right and drawing the nut 63 and wall 19 to the left, as viewed in FIG. 2, as the sloping surfaces of raised portions 75 wedge against the sloping surfaces of raised portions 71. The walls 17 and 19 thus clamp the walls 35 and 37 and secure the bracket 13, as well as the column 1 attached thereto, in the selected position. The spring 78 is relatively strong so that a strong clamping force is applied by the walls 17 and 19. However, since the rod 51 has a relatively long shank portion 57 the force applied by the driver's foot to the pedal 55 may be proportionately less.

It will be seen that the column may be placed and clamped in an infinite number of positions over a range determined by the length of the slots 47 and it is not necessary to place the column in one of a plurality of preselected positions.

In view of the foregoing it will be seen that the several objects of the invention are achieved.

Although only one embodiment of the invention has been disclosed and described, it is apparent that other embodiments and modifications of the invention are possible.

I claim:

1. Adjustable steering column apparatus for a vehicle comprising a steering column having a steering wheel at the upper end thereof, said steering column being movable relative to said vehicle, a first bracket fixed relative to said vehicle, said first bracket having an inverted generally U-shaped configuration, with downwardly depending side walls, a second bracket attached to said column and movable therewith adjacent and relative to said first bracket, said second bracket having an inverted generally U-shaped configuration with downwardly depending side walls, said second bracket being within said first bracket with the side walls of said brackets being adjacent one another, and means for clamping said side walls of said first bracket against said side walls of said second bracket in an infinite number of positions throughout a range of movement of said column and second bracket, said means for clamping said brackets together including cam means actuatable between a first position wherein said second bracket is movable relative to said first bracket, and a second position in which said second bracket is clamped by said first bracket, and a shaft extending through all of said side walls, said shaft having clamping members thereon outside the side walls of said first bracket, said cam means causing said clamping members to engage said side walls of said first bracket when said cam means is moved from said first position to said second position.

2. Adjustable steering column apparatus for a vehicle comprising a steering column having a steering wheel at the upper end thereof, said steering column being movable relative to said vehicle, a first bracket fixed relative to said vehicle, a second bracket attached to said column and movable therewith adjacent and relative to said first bracket, and means for clamping said brackets together in an infinite number of positions throughout a range of movement of said column and second bracket, said first bracket having side walls thereon spaced apart from one another, said second bracket having side walls thereon spaced apart from one another and located adjacent and inside the side walls of said first bracket, said side walls of said second bracket having slots therein, said clamping means including a shaft extending through said side walls of said first bracket and through said slots, means on one end of said shaft engaging one wall of said first bracket, first cam means on said shaft, and second cam means on the other wall of said first bracket engaging said first cam means, said first cam means being movable relative to said second cam means to a first position to move said walls of said first bracket toward one another to clamp said second bracket in a selected position and movable relative to said second cam means to a second position to allow said walls of said first bracket to move away from said walls of said second bracket to release the same.

3. Adjustable steering column apparatus as set forth in claim 2 further including a tubular spacer surrounding said shaft between the side walls of said second bracket.

4. Adjustable steering column apparatus as set forth in claim 2 wherein said clamping means further includes a lever connected to said shaft, a spring extending between said lever and said first bracket biasing said first cam means toward said first position, and release means connected to said shaft and movable to move said first cam means toward said second position.

5. Adjustable steering column apparatus as set forth in claim 4 wherein said release means comprises a release member connected to said cam means, said release member having a pedal portion.

6. Adjustable steering column apparatus as set forth in claim 5 further including a spring connected to said brackets and extending therebetween, said spring biasing said second bracket toward said first bracket.

7. Adjustable steering column apparatus for a vehicle having instrument panel means, comprising a steering column, a first bracket connected to said instrument panel means, a second bracket attached to said column, said first bracket having side walls thereon, spaced apart from one another, said second bracket having side walls located adjacent and between the side walls of said first bracket, said second bracket being movable to an infinite number of positions throughout a range of movement of said second bracket, and means for clamping said side walls of said first bracket against said side walls of said second bracket in any position throughout said range to hold said column against substantial movement relative to said instrument panel, said side walls of said second bracket having elongated slots therein, said means for clamping said side walls together comprising a shaft extending through said side walls of said first bracket and through said slots, means in one end of said shaft engaging one side wall of said first bracket, first cam means adjacent the other side wall of said first bracket, second cam means adjacent and engaging said first cam means, means biasing said shaft and second cam means toward one position in which said cam means cause said walls of said first bracket to frictionally grip the side walls of said second bracket.

8. Adjustable steering column apparatus as set forth in claim 7 wherein said means for clamping said side walls together further comprises a release member adapted to be actuated to overcome said means biasing said shaft and cam means to permit said side walls of said first bracket to release said side walls of said second bracket.

9. Adjustable steering column apparatus as set forth in claim 7 wherein said means biasing said shaft and second cam means comprises a lever attached at one end to said shaft, and a spring extending between the other end of said lever and said first bracket.

10. Adjustable steering column apparatus as set forth in claim 7 wherein said first cam means has raised portions thereon, said second cam means having raised portions thereon, said means biasing said shaft and second cam means toward said one position biasing said raised portion of said second cam means against said raised portions of said first cam means.

11. Adjustable steering column apparatus as set forth in claim 7 including means biasing said second bracket toward said first bracket.

12. Adjustable steering column apparatus as set forth in claim 11 wherein said side walls of said second bracket have elongated slots therein, said means for clamping said side walls together comprising a shaft extending through said side walls of said first bracket and through said slots, means in one end of said shaft engaging one side wall of said first bracket, first cam means adjacent the other side wall of said first bracket, second cam means adjacent and engaging said first cam means, means biasing said shaft and second cam means toward one position in which said cam means cause said walls of said first bracket to frictionally grip the side walls of said second bracket.

13. Adjustable steering column apparatus as set forth in claim 12 wherein said means for clamping said side walls together further comprises a release member adapted to be actuated to overcome said means biasing said shaft and cam means to permit said side walls of said first bracket to release said side walls of said second bracket.

14. Adjustable steering column apparatus as set forth in claim 13 wherein said means biasing said shaft and second cam means comprises a lever attached at one end to said shaft, and a spring extending between the other end of said lever and said first bracket.

15. Adjustable steering column apparatus as set forth in claim 14 wherein said first cam means has raised portions thereon, said second cam means having raised portions thereon, said means biasing said shaft and second cam means toward said one postiion biasing said raised portions of said second cam means against said raised portions of said first cam means.

* * * * *